July 29, 1941.  W. J. LUMBERT  2,250,871
WELL SCREEN
Filed Sept. 27, 1938  2 Sheets-Sheet 1
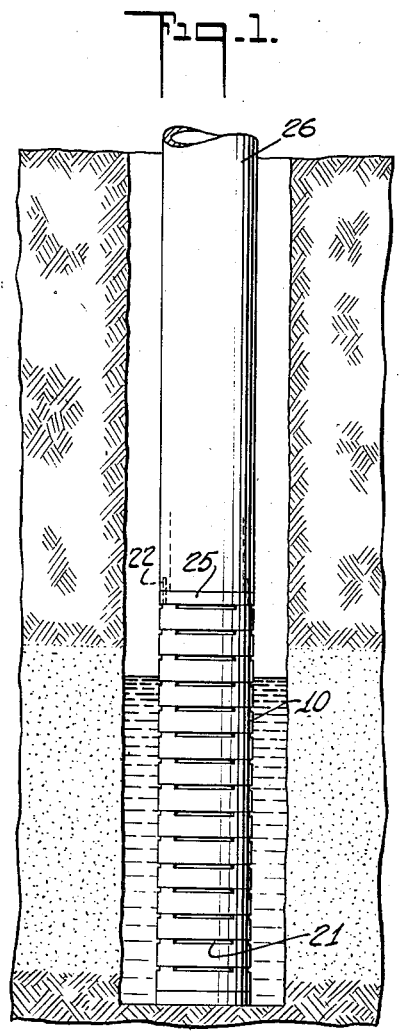
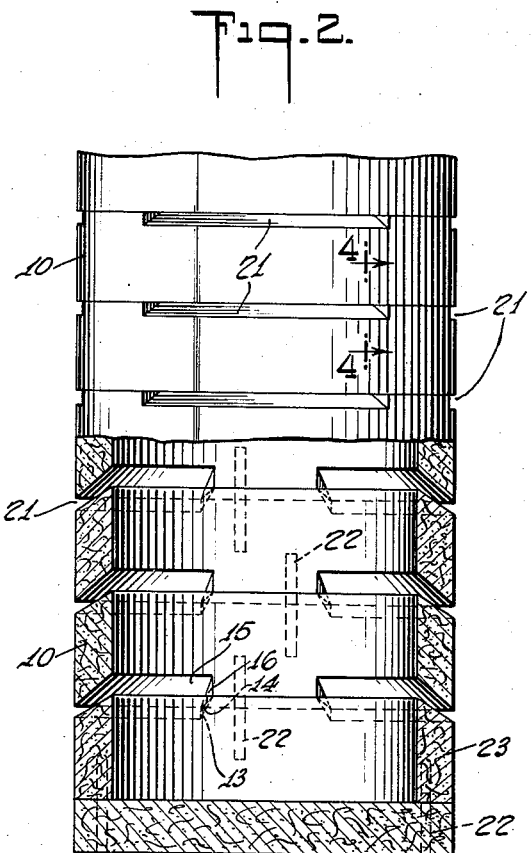
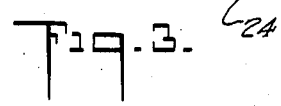
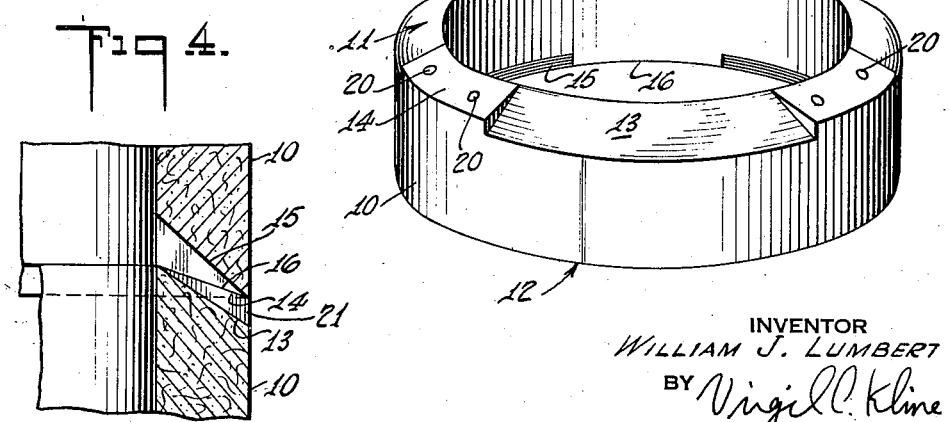
INVENTOR
WILLIAM J. LUMBERT
BY
ATTORNEY July 29, 1941.  W. J. LUMBERT  2,250,871
WELL SCREEN
Filed Sept. 27, 1938  2 Sheets-Sheet 2

INVENTOR
WILLIAM J. LUMBERT.
BY Virgil C. Kline
ATTORNEY

Patented July 29, 1941

2,250,871

UNITED STATES PATENT OFFICE 2,250,871

WELL SCREEN

William J. Lumbert, Scituate, Mass., assignor to Johns-Manville Corporation, New York, N. Y., a corporation of New York Application September 27, 1938, Serial No. 231,857

6 Claims. (Cl. 166—5)

The present invention relates to well casings, and particularly to screens of the type employed to prevent the entry of sand, fine gravel, and the like into the well tubing. The invention is primarily concerned with such screens for use in conjunction with water wells and has special applicability in connection with wells where a large flow of water is desired, for example, wells for municipal water supplies, irrigation projects, and the like. However, the invention is also applicable and exhibits its numerous advantages when used with wells for other purposes and of other types, for example, oil wells and the like.

An object of the present invention is the provision of a well screen of a character to enable a large flow of water or other fluid into the well and to exhibit an efficient screening function in sand and gravel strata without clogging.

Another object of the invention is the provision of a well screen comprising a plurality of similar and interchangeable sections which may be readily and expeditiously assembled to provide the screen in any desired length.

Another object of the invention is the provision of a well screen composed of a plurality of similar interchangeable sections having cooperating portions serving to form louvers.

A further object of the invention is the provision of a well screen composed of a hardened compressed composition which is non-corrodible.

The above objects are attained by my invention, which, briefly stated, resides in a well screen comprising a plurality of generally cylindrical sections, each composed preferably of a compressed and hardened asbestos-cement material. Each section suitably includes a bevelled upper end wall and a bevelled lower end wall, the upper and lower walls having substantially vertically aligned bevelled portions with a greater angle of inclination with respect to the horizontal than the remaining portions. The arrangement of said aligned portions is such that in the assembly outwardly and downwardly slanting louvers are formed of greatest vertical width at the interior of the screen and of least vertical width at the exterior of the screen. The sections are suitably secured in assembled relationship by means of pins or the like which may extend through aligned apertures continuously from the top to the bottom of the screen or which may preferably be in short sections in the form of dowel pins interconnecting only adjacent sections of the screen.

The well screen of the type briefly described above insures against clogging of the louvers by sand, fine gravel, or the like, due to the upward slant of the louvers in conjunction with the continuous increase in the vertical width of the louvers from the exterior of the screen to the interior thereof. Thus, the louvers constitute, in effect, continuously expanding chambers without constrictions or portions of uniform vertical width, and hence, any sand, fine gravel, or the like which may enter the same does not become jammed within the louvers or otherwise interfere substantially with the passage of water or other fluid therethrough. In the event the sand or fine gravel becomes deposited upon the lower surface of a louver, it will be readily washed out again when the flow of water or other fluid into the well casing is stopped, due to the downward inclination of the entire extent of such surface.

The sectional construction of the screen, particularly when dowel pins or the like are employed for connecting adjacent sections, is susceptible to ready assembly to any length desired as may be determined on the job, it being only required that there be on hand a suitable number of the screen sections of the desired diameter and the dowel pins. In the event of breakage or damage to any of the sections in the use of the screen, the damaged section may be readily replaced by separating the assembly, removing the damaged part, and inserting a new section. The compressed hardened asbestos-cement composition, of which the sections of the well screen are preferably composed, provides a rigid, long-wearing, non-corrodible, permanent construction.

The invention will be more fully understood and further objects and advantages thereof will become apparent when reference is made to the more detailed description thereof which is to follow and to the accompanying drawings in which—

Fig. 1 is a view illustrating a well screen of the present invention in position within a well or the like;

Fig. 2 is a view partially in elevation and partially in section depicting a well screen of the present invention;

Fig. 3 is a perspective view of one section of a well screen such as that of Fig. 2;

Fig. 4 is a view taken on the line 4—4 of Fig. 2;

Figure 5:
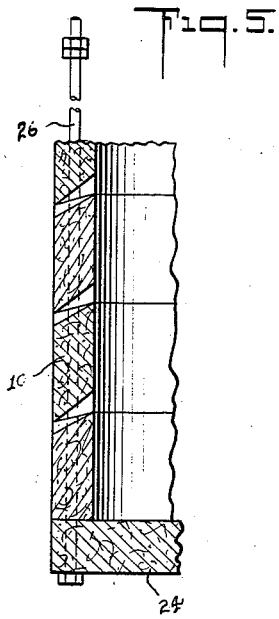
Fig. 5 is a sectional view illustrating a variation of the invention.

Referring now to the drawings, and particularly to Figs. 1 and 2, a well screen is depicted which comprises a plurality of individual sections 10, each of which is composed, in accordance with the preferred form of the invention, of an asbestos-cement composition. Such composition may suitably comprise asbestos fibres and cement in compressed, densified and hardened condition such as is at present employed for the manufacture of pipe and the like. The sections, see particularly Figs. 2, 3, and 4, are preferably of cylindrical shape, although other shapes may be used if desired, and include an upper bevelled end surface 11 and a lower bevelled end surface 12. The upper bevelled end surface includes portions 13 having a greater angle of inclination with respect to the horizontal than the remaining portions 14, and the lower surfaces similarly have portions 15 of a greater angle of inclination with respect to the horizontal than the remaining portions 16, the portions 13 and 15 being in vertical alignment and of substantially equal circumferential extent. The portions 13 and 15 suitably comprise the greater proportion of the upper and lower surfaces, respectively, of the sections. The angles of inclination of the portions 14 and 16 are preferably made equal. The portions 14 and 16 form abutment surfaces and are provided with apertures or perforations 20, preferably spaced a uniform distance from the ends of the portions and extending vertically and suitably from top to bottom of the sections.

The sections are assembled as illustrated particularly in Figs. 1 and 2 with the abutment surface 14 of each section contiguous to the abutment surface 16 of the section thereabove, the portions 13 and 15 of the adjacent sections defining therebetween louvers indicated in their entirety at 21. Due to the relative angles of inclination of the portions 13 and 15 as described above, the louvers 15 slant downwardly and outwardly and are relatively wider at the interior of the screen than at the exterior of the same. The louvers may be made of any desired dimensions in conformity with the particular conditions under which the screen is to be employed. However, for the purposes of illustration only, it may be stated that the louvers may suitably have an exterior vertical width of, say, 0.20 inch and an interior vertical width of, say, 0.40 inch. The angles of inclination of the top and bottom surfaces of the portions 13 and 15 and of the surfaces of the portions 14 and 16 may be, say, substantially those disclosed in Fig. 4.

The interconnection of the several individual sections to form an assembled screen is preferably obtained by means of dowel pins 22 suitably composed of brass or other non-corrodible metal and extending into aligned perforations 20 of adjacent sections. As illustrated in Fig. 2, the pins 22 may be staggered by utilizing alternate ones only of the spaced apertures in the abutting surfaces of each of the sections. The dowel pins are suitably of a diameter to require the same to be forced within the apertures or perforations 20 or, if desired, they may be of slightly smaller diameter than the perforations and be cemented in place with any suitable waterproof adhesive.

Figure 6:
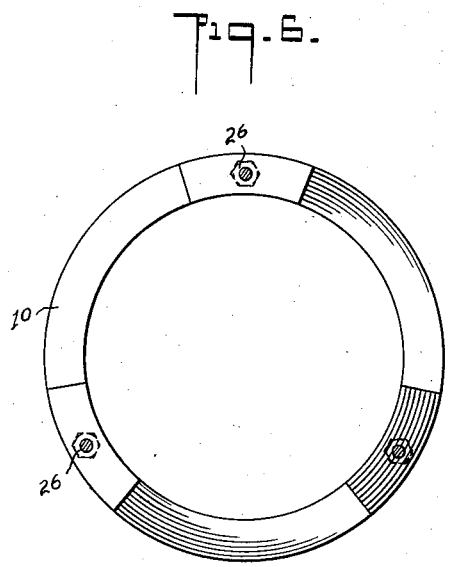
Fig. 6 is a plan view of one section of the well screen illustrating the variation shown in Fig. 5.
Figure 7:
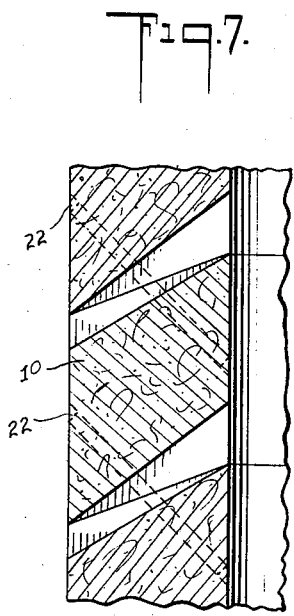
Fig. 7 is a sectional view illustrating a variation of the invention shown in Fig. 6.
Figure 8:
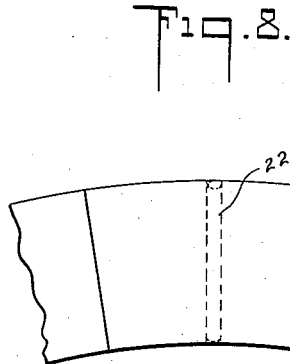
Fig. 8 is a plan view of one section of the well screen illustrating the variation shown in Fig. 7.

In lieu of the use of dowel pins as described above, continuously extending pins or rods may be employed which interconnect all the adjacent sections and, as well, secure the screen to the well casing. Such a construction is shown in Figs. 5 and 6 where well screen sections 10 are joined together and to the bottom plate 24 by continuously extending rods 26. Also, as an alternative construction, the perforations may be placed in slanting position to extend from the outer face of a lower section to an inner face of a section thereabove, short pins being employed in said slanting perforations. This construction is shown in Figs. 7 and 8 where well screen sections 10 are joined together by pins 22.

The well screen may suitably include a bottom section 23 having an upper end surface of similar configuration to the upper surfaces of sections 10 and a continuous horizontal lower surface and an imperforate bottom plate 24 connected to said lower section by suitably spaced pins 22. Similarly, the upper end of the screen may be provided with a section 25 (see Fig. 1) having an upper continuous horizontal surface and a lower end surface, the latter corresponding to the lower end surfaces of the sections 10, said upper section being connected to the well casing or tubing 26 by pins 22.

Referring particularly to Fig. 1, there is illustrated the complete assembly of the well screen with the well casing 26, the screen being suitably placed in the water at the bottom of the well or in water bearing strata. As has been heretofore pointed out, sand, fine gravel, and the like, which may tend to be drawn into the casing, due to the inward movement of the water, is excluded for the most part by the comparatively narrow openings provided by the louvers 21. However, in the event that such sand or fine gravel is drawn into the louvers, the passage of the water is in no way impeded, due to the continuous inward expansion of the louvers.

The sections of which the well screen is formed may be produced in any desired manner, but most suitably by cutting the same from a pipe or tubing of the desired diameter and preferably composed of a hardened asbestos-cement composition of known type. The sections, after being cut, can be readily shaped and drilled to provide the desired configuration of upper and lower surfaces and to form the perforations 20.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A well screen comprising an assemblage of cylindrical sections, each of said sections including a bevelled upper end wall and a bevelled lower end wall, said upper and lower walls having bevelled aligned portions, the bevel of said aligned portions extending inwardly and upwardly, the angle of inclination of said aligned portions being greater than the angle of inclination of the remaining portions, and the angle of inclination of said aligned portions of the upper wall being less than the angle of inclination of said aligned portions of the lower wall, and means securing adjacent sections in assembled relationship.

2. A well screen comprising an assemblage of cylindrical sections, each of said sections including a bevelled upper end wall and a bevelled lower end wall, said upper and lower walls having bevelled aligned portions, the bevel of said aligned portions extending inwardly and upwardly, the angle of inclination of said aligned portions being greater than the angle of inclination of the remaining portions, and the angle of inclination of said aligned portions of the upper wall being less than the angle of inclination of said aligned portions of the lower wall, and dowel pinns connecting two adjacent sections in said remaining portions of said wall.

3. A well screen section comprising a cylindrical member having a bevelled upper end wall and a bevelled lower end wall, said upper and lower end walls having bevelled aligned portions, the bevel of said aligned portions extending inwardly and upwardly, the angle of inclination of said aligned portions being greater than the angle of inclination of the remaining portions, and the angle of inclination of said aligned portions of the upper end wall being less than the angle of inclination of said aligned portions of the lower end wall.

4. A well screen comprising a cylindrical member of a hardened, compressed, asbestos-cement material and having a bevelled upper end wall and a bevelled lower end wall, said upper and lower end walls having bevelled aligned portions, the bevel of said aligned portions of the upper and lower walls extending inwardly and upwardly, the angle of inclination of said aligned portions being greater than the angle of inclination of said bevelled upper and lower end walls, and the angle of inclination of said aligned portions of the upper end wall being less than the angle of inclination of said aligned portions of the lower end wall.

5. A well screen comprising an assemblage of cylindrical sections, each of said sections including a bevelled upper end wall and a bevelled lower end wall, said upper and lower walls having bevelled aligned portions, the bevel of said aligned portions extending inwardly and upwardly, the angle of inclination of said aligned portions being greater than the angle of inclination of the remaining portions, and the angle of inclination of said aligned portions of the upper wall being less than the angle of inclination of said aligned portions of the lower wall, and continuously extending rods securing adjacent sections in assembled relationship.

6. A well screen comprising an assemblage of cylindrical sections, each of said sections including a bevelled upper end wall and a bevelled lower end wall, said upper and lower walls having bevelled aligned portions, the bevel of said aligned portions extending inwardly and upwardly, the angle of inclination of said aligned portions being greater than the angle of inclination of the remaining portions, and the angle of inclination of said aligned portions of the upper wall being less than the angle of inclination of said aligned portions of the lower wall, and pins inserted in the sections at an angle to the longitudinal axis of the cylinder and securing adjacent sections in assembled relationship.

WILLIAM J. LUMBERT.